(No Model.)
C. K. WELCH.
PNEUMATIC TIRE.
No. 494,611. Patented Apr. 4, 1893.
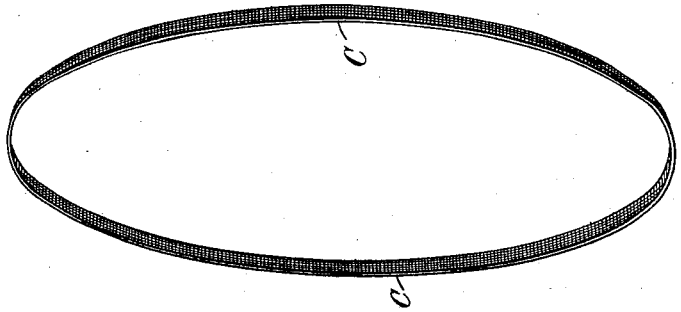
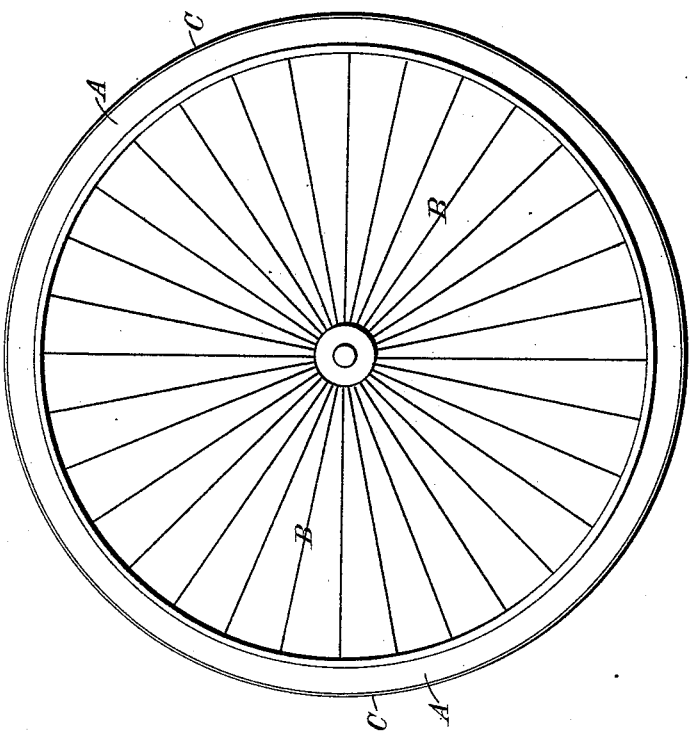
Witnesses:
M. G. Tracy.
James Catlow
Inventor
Charles K. Welch
by
Duncan & Page
Attorneys

UNITED STATES PATENT OFFICE.

CHARLES KINGSTON WELCH, OF COVENTRY, ENGLAND, ASSIGNOR TO THE PNEUMATIC TYRE AND BOOTH'S CYCLE AGENCY, LIMITED, OF DUBLIN, IRELAND.

PNEUMATIC TIRE.

SPECIFICATION forming part of Letters Patent No. 494,611, dated April 4, 1893.

Application filed December 7, 1892. Serial No. 454,342. (No model.)

*To all whom it may concern:*

Be it known that I, CHARLES KINGSTON WELCH, engineer, a subject of the Queen of Great Britain, and a resident of Coventry, England, have invented certain new and useful Improvements Relating to Pneumatic Tires for Vehicle-Wheels, of which the following is a specification, reference being had to the accompanying drawings.

My invention relates to pneumatic tires for vehicle wheels, and has for its object to prevent what is known as "side slip" of such tires. It is known that a band of webbing or canvas secured longitudinally on the outer circumference of the tread portion of the tire will reduce side slip but the lapped or butt joint at the end of the strip causes trouble inasmuch as there is a great tendency for the strip to gradually separate from the tire.

The chief feature of my invention relates to the provision of an endless band or strip of canvas or the like secured to the outer circumference of the tire in any suitable manner.

In the accompanying drawings, Figure 1 shows a wheel provided with my improvement. Fig. 2 shows the endless band of woven fabric hereinafter described.

In carrying my invention into practice, I form a woven tube of canvas or other suitable fabric of the same diameter as the tire A of the cycle wheel B on which the strip is to be fitted. This tube I then coat with india-rubber solution and after the solution has dried I cut it transversely so as to form endless rings or bands C of rubber-coated canvas of suitable width, one such ring being shown in Fig. 2. It will be seen that the weft of the fabric forms the longitudinal threads of the endless strip or ring, the warp forming the short transverse threads. The edges of the strip are prevented from unraveling by means of the india-rubber with which the said strip is coated. The strip is secured to the periphery of the tire by means of solution or by other suitable means. I sometimes arrange that the endless strip C shall be a little smaller than the periphery of the tire when the said tire is inflated, and secure the same thereto by first deflating the tire and placing the strip in position thereon, and then gradually inflating the tire which expands against the strip until, when the tire is fully inflated, the strip is held quite firmly. In attaching a strip to a tire by this latter method I sometimes use india-rubber solution to render it more secure. I sometimes vulcanize the endless strip to the outside of the tire cover. A tire fitted with an endless strip as above indicated slips very little and is less liable to puncture. Moreover since the strip is woven endless there is no tendency for the same to unravel or become detached from the tire even when the brake is applied.

What I claim is—

1. In a wheel, the combination of a pneumatic tire and an endless ring made of a woven fabric and secured to the outside of said tire, forming the tread portion thereof, substantially as described for the purpose specified.

2. In a wheel, the combination of a pneumatic tire, an endless ring made of a woven fabric secured to the outside of said tire and forming the tread portion thereof, and a coating of india-rubber solution for said woven fabric, substantially as described for the purpose specified.

3. As an article of manufacture, a wheel provided with a pneumatic tire in combination with an endless woven strip of fabric secured around said tire and forming the tread portion thereof, substantially as described for the purpose specified.

In witness whereof I have hereunto set my hand this 25th day of November, 1892.

CHARLES KINGSTON WELCH.

Witnesses:
FREDERICK WILLIAM LE TALE,
THOMAS LAKE.